UNITED STATES PATENT OFFICE.

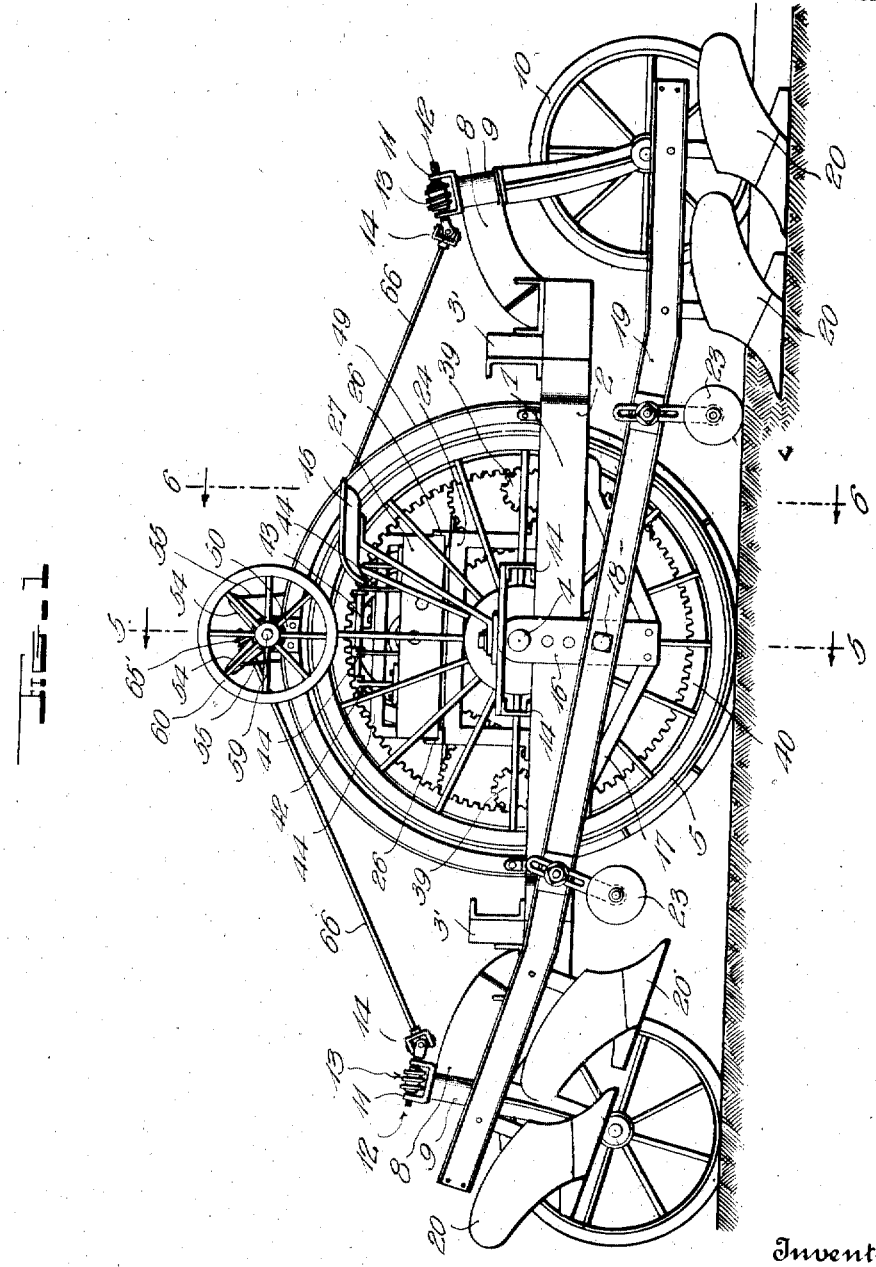

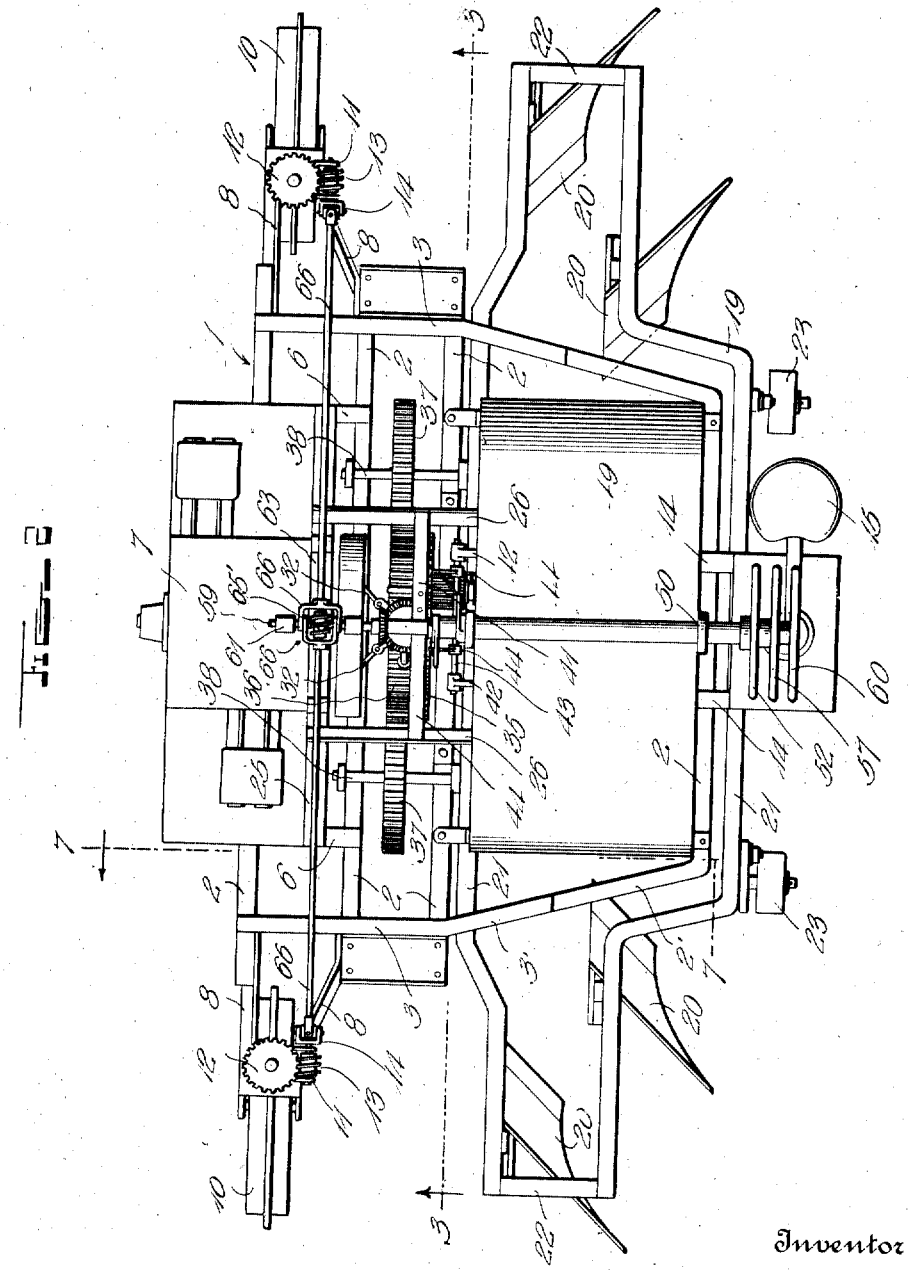

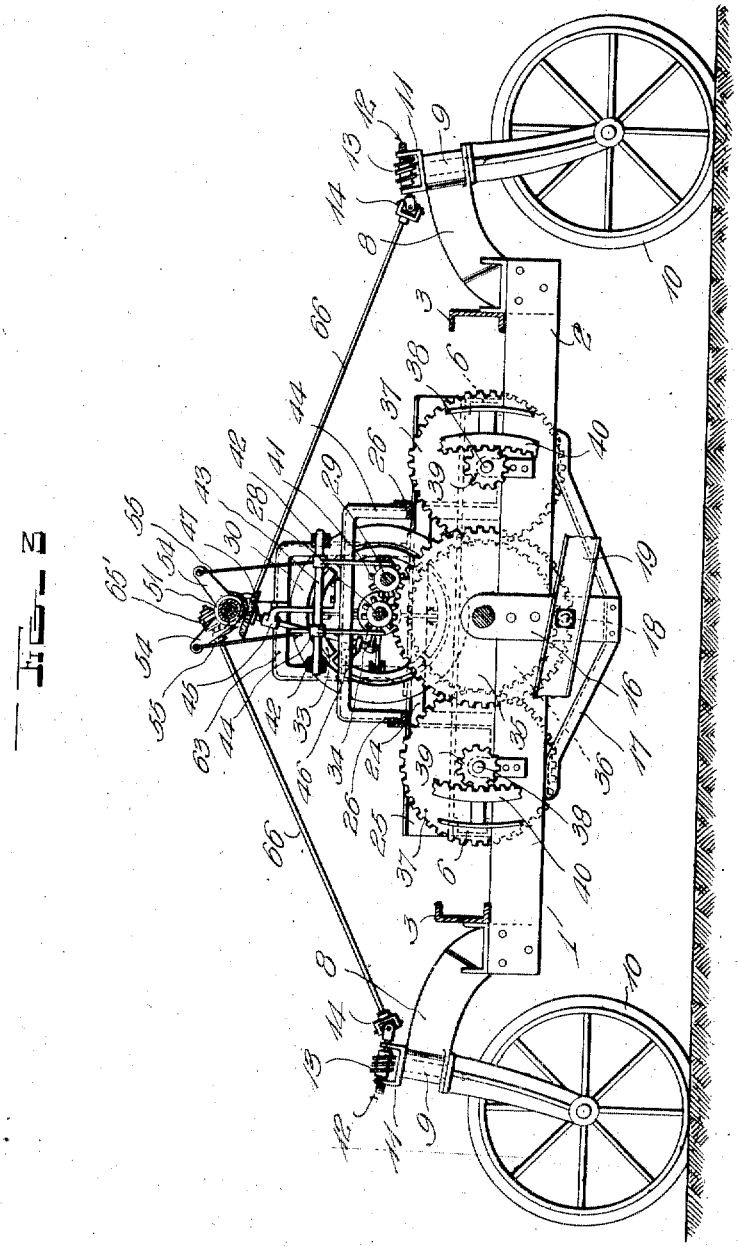

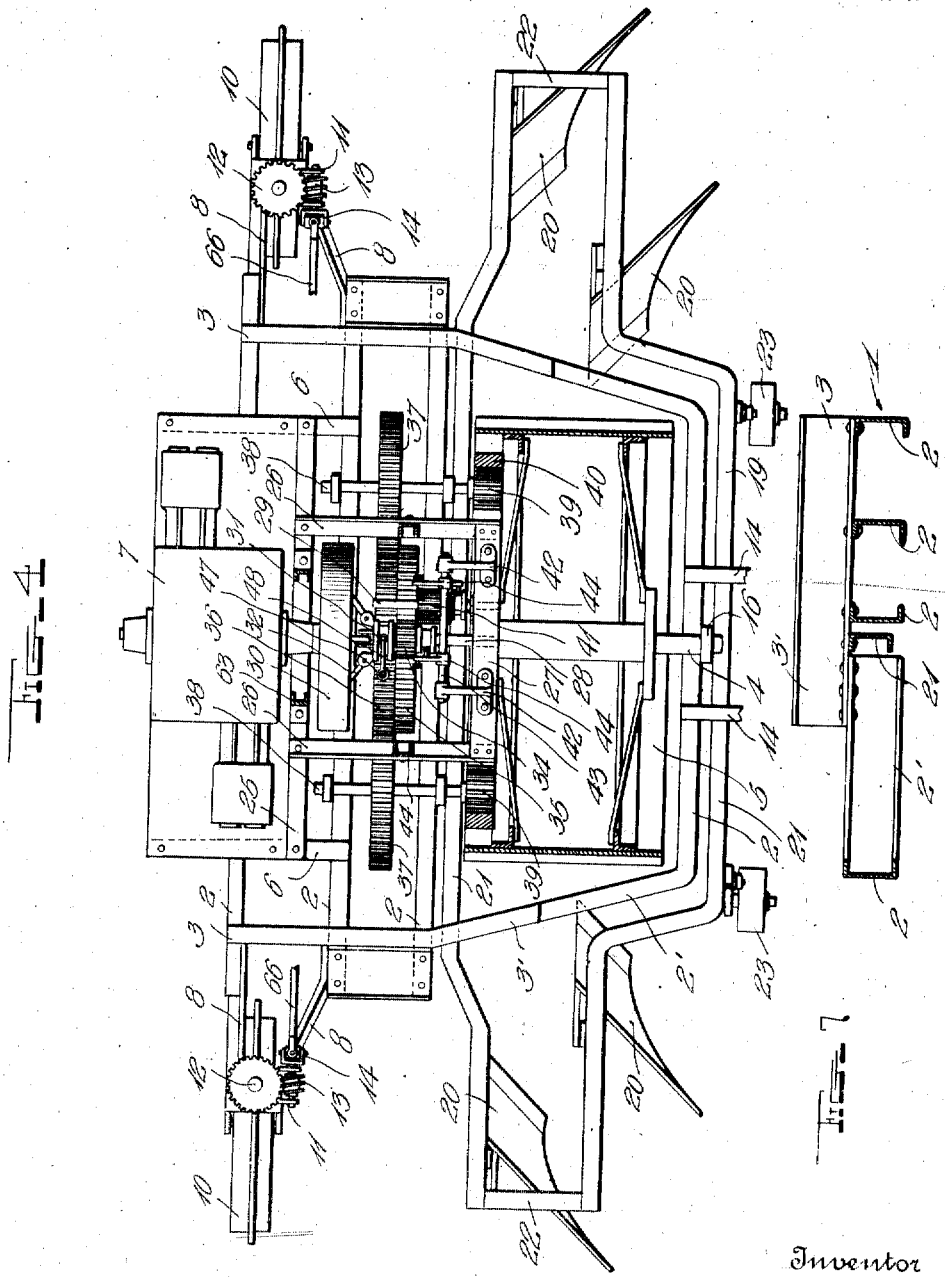

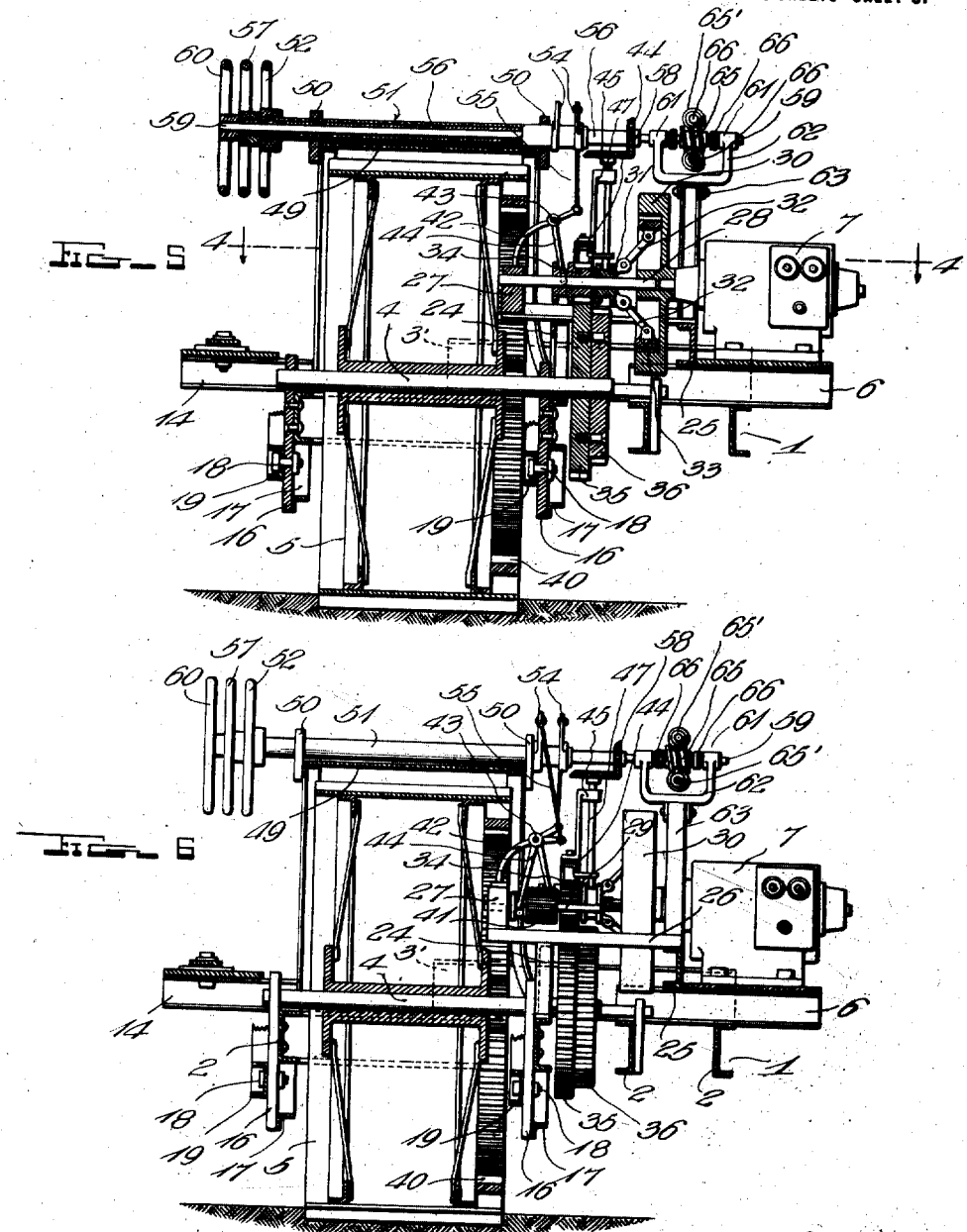

IRA L. SCOTT, OF FORT COLLINS, COLORADO, ASSIGNOR TO THE TWO WAY TRACTOR COMPANY, OF DENVER, COLORADO, A CORPORATION OF COLORADO.

REVERSIBLE TRACTOR-PLOW.

1,249,524.

Specification of Letters Patent.

Patented Dec. 11, 1917.

Application filed April 27, 1917. Serial No. 164,918.

*To all whom it may concern:*

Be it known that I, IRA L. SCOTT, a citizen of the United States, residing at Fort Collins, in the county of Larimer and State of Colorado, have invented certain new and useful Improvements in Reversible Tractor-Plows; and I do declare the following to be a full, clear, and exact description of the invention, such as will enable others skilled in the art to which it appertains to make and use the same.

My invention relates to tractor plows and more especially to that class of tractor plows which are reversible and adapted for two-way plowing.

The principal object of my invention is to provide a tractor plow which is of novel construction and in which a plow-carrying member is so disposed as to be pivotally mounted in the frame of the tractor below the axle of the tractor wheel and establishing a more direct pull upon the plows than is obtainable with any of the tractors in use at the present day.

This manner of mounting the plow-carrying member in a tractor frame so as to provide a direct pull upon the plows, is of inestimable value in tractor construction, and I desire to lay particular emphasis herein on this manner of mounting the plow-carrying member, as it forms a very essential element of my invention, which is claimed broadly in my co-pending application, Serial No. 166,049, renewal of original application, Serial No. 98,425, filed May 19, 1916.

Heretofore it has been the custom in constructing tractors of the type described, to mount a plow-carrying frame within the frame of the tractor, usually with the pivot above the axle of the tractor wheel or otherwise disposed on the frame of the tractor. Such a manner of construction does not obtain the maximum of efficiency in the operation of the tractor, as the plows will have a tendency to disengage, but in my construction, owing to the pivot being mounted below the tractor wheel axle so that the plow-carrying member can swing below the main frame, a direct pull is insured at all times and disengagement of the plow members is practically eliminated.

Another object of my invention is to provide a tractor of this character in which the plow members are disposed directly in the path of travel of the tractor wheel and adjacent thereto so that a more direct pull is exerted upon the plow members, and owing to their adjacent relation with the tractor wheel itself, the ground in front of the plows is to a certain extent leveled, thereby insuring an even ground through which the plowshare will travel.

A further object of my invention is to provide in a tractor of this character, a novel construction and arrangement of a motor and gearing to drive the tractor wheel and also to provide a novel construction of operating mechanism for shifting the gearing as well as a novel construction of operating mechanism for directing the steering wheels of the tractor.

With these and other general objects in view, which will appear in the description, my invention resides in the novel construction, combination, and arrangement of parts to be more fully hereinafter described and claimed and taken in connection with the accompanying drawings which form a part of this application, and in which:

Figure 1 is a side elevation of my improved tractor plow;

Fig. 2 is a top plan view of the same;

Fig. 3 is a longitudinal vertical section taken on the line 3—3 of Fig. 2;

Fig. 4 is a horizontal section taken substantially on the line 4—4 of Fig. 5;

Fig. 5 is a vertical transverse section on the line 5—5 of Fig. 1;

Fig. 6 is a vertical transverse section on the line 6—6 of Fig. 1; and

Fig. 7 is a detail vertical section on the line 7—7 of Fig. 2.

Referring more particularly to the drawings in which like reference characters indicate corresponding parts, my invention comprises in detail a substantially rectangular frame 1 composed of a plurality of longitudinal parallel spaced angle iron or steel beams 2 secured adjacent their ends to transversely extending end bars 3 formed of like material. Mounted intermediate the ends of the frame and extended transversely thereacross is an axle 4 having a tractor wheel 5 mounted thereon adjacent one side of the frame. The tractor wheel is of relatively large diameter and is adapted to form a support for the side of the frame on which it is mounted. The ends of the side bar 2 of the frame are bent inwardly and divergently adjacent the tractor wheel and terminate in spaced relation from the adjacent longitudinal bar of the frame as clearly illustrated in Fig. 7. The inwardly bent portions of the side bar 2 as designated at 2' are secured to the correspondingly extending portions 3' of the end bars 3, which construction provides a clearance between the terminals of the side bar 2 and the adjacent bar of the frame for a plow-carrying frame to swing therebetween as will be hereinafter described, and furthermore it provides a construction whereby the end bars 3 will limit the swing of the plow carrying frame to be described.

Secured to the longitudinal bars of the frame at the side opposite the tractor wheel and projecting outwardly therefrom is a pair of angle beams 6 adapted to form a support for a motor 7 mounted thereon. From the opposite ends of the adjacent longitudinal beams at the side of the frame carrying the motor are extended upwardly convergent arms 8 provided with bearings 9 at their convergent ends to receive therethrough the spindles of a pair of swiveled guide and steering wheels 10 mounted therein as clearly illustrated in Fig. 1. The wheels 10 coact with the tractor wheel at the opposite side of the frame to provide a three-wheeled support for the tractor. Laterally extending brackets 11 are formed at the top of the bearings 9 to receive therein worm gears 12 disposed in mesh with worm gears 13 secured to the upper ends of the spindles of the wheels 10 and connected by means of universal joints 14 with steering mechanism to be hereinafter described.

Extending transversely from the side bar of the frame adjacent the tractor wheel is a pair of similar beams 14' suitably secured and adapted to form a platform having mounted thereon the ordinary type of drivers' seat 15 having swiveled connection with the platform whereby it may be swung from side to side as desired. Secured to the side bar of the frame adjacent the tractor wheel and to the longitudinal bar of the frame adjacent the opposite side of the tractor wheel is a pair of standards 16 extended downwardly from the bars of the frame and projecting slightly above the bars to provide bearings for the axle of the tractor wheel as clearly illustrated in Figs. 5 and 6. These standards 16 are preferably braced by bracing bars 17 secured to the lower ends of the standards and extending longitudinally with their opposite ends secured to the adjacent bars of the frame as best illustrated in Fig. 1, thereby insuring a firm support for the standards.

Pivotally mounted on a pair of stub axles 18 journaled in the standards 16 directly beneath the tractor axle is a longitudinally extending plow-carrying frame 19 which owing to its manner of mounting, is adapted to swing below the frame This plow-carrying frame 19 is a supplemental frame which is balanced on its pivots in such a manner that either end thereof having plows 30 secured thereon may be brought into engagement with the surface of the field which it is desired to plow. This supplemental plow-carrying frame surrounds the tractor wheel and projects at its ends beyond the adjacent end bars 3 of the main frame beneath which it swings, and the end portions of the frame extending beyond the adjacent end bars 3 are bent slightly upward to provide a clearance for the earth-working elements 20, in this instance the plowshares, when they are brought into engagement with the surface of the soil. The extending end portions of the supplemental frame carrying the earth working elements are narrow so as to dispose the elements directly in the path of travel of the tractor wheel and in adjacent relation thereto, as illustrated in Fig. 2.

In detail the supplemental frame comprises a pair of longitudinal side bars 21 connected by transversely extending end bars 22. The side bars 21 are pivoted in a manner hereinbefore described directly below the axle of the tractor wheel by means of the stub axles mounted in the standards 16 and are substantially convergent at their opposite ends projecting beyond the end bars 3 of the main frame to form the narrow portions as described. From the point at which the side bars extend beyond the adjacent end bars of the main frame, they are inclined slightly upward from the longitudinal plane of the bars to provide a clearance as described, and in the narrowed end portions of this supplemental frame are suitably mounted the plows 20 or other earth-working elements as desired.

Either end of the supplemental frame 19 may be lowered so as to bring the plows into engagement with the surface of the field, whereupon the opposite end will be swung upwardly and into contact with the bottom of the end bar 3 of the main frame as clearly illustrated in Fig. 7, whereupon the adjacent side bar of the supplemental frame will be held within the clearance formed by the portion 2' of the side bar 2 of the main frame so as to prevent lateral shifting of the supplemental frame and provide a positive means for holding the same therein. Suitable gage wheels 23 are provided at advantageous points on the bars of the supplemental frame 19.

By this construction it will be seen that the earth-working elements will be disposed directly in the path of travel of the tractor wheel and relatively adjacent thereto which will insure a more even plowing effect as the tractor wheel will act substantially to level the ground in front of the plows, and owing to the pivotal mounting of the supplemental plow-carrying frame below the axle of the tractor wheel, a more even and direct pull will be insured and all danger of the plows becoming disengaged will be eliminated. This feature I desire to strongly emphasize, as it is a very important one and is not obtainable in the types of tractor plows used at the present time.

As a means of supporting the gearing adapted for connection between the motor and the tractor wheel, I provide a substantially inverted U-shaped bracket 24 secured at its ends to the longitudinal bar of the main frame adjacent the inner side of the tractor wheel. Mounted longitudinally on the transversely extending beams 6 is a similar beam 25, and between the beam 25 and the bracket 24 are extended transversely beams 26 to form a suitable framework for supporting the gearing.

Secured to the inner ends of the beams 26 and extending longitudinally therebetween is a casting member 27 provided with bearings to receive the ends of a clutch shaft 28 and to receive also a stub shaft 29 rigidly secured therein at a point spaced to one side of the clutch shaft 28 for a purpose to be herein described. The clutch shaft 28 has its opposite end journaled in the fly wheel 30 of the motor, and slidably mounted on the shaft is the ordinary type of friction clutch member 31 having hinged arms 32 with the split engaging band 33 for frictional engagement with the surface of the fly wheel 30. The clutch member 31 is slidably keyed to the shaft 28 and is adapted to be moved thereon in a manner to be hereinafter described. Slidably keyed to the shaft 28 in a similar manner is a drive pinion 34 adapted to be shifted in a manner to be hereinafter described and disposed for mesh with a gear wheel 35 having secured thereon an intermediate gear wheel 36 in mesh with a pair of gear wheels 37 mounted between the longitudinal bars of the main frame on axles 38 suitably journaled on the bars of the frame, as disclosed in Fig. 4.

The gear wheels 37 are splined or otherwise secured on the shafts 38, and on the inner ends of the shafts are mounted drive pinions 39 disposed in mesh with an internal gear comprising a gearing ring 40 secured on the tractor wheel as disclosed in Figs. 5 and 6 for driving connection with the wheel.

On the stub shaft 29 secured in the casting 27 as hereinbefore described, is slidably mounted a reversing pinion 41 which is adapted to be suitably actuated for imparting a reverse drive to the tractor wheel. Upwardly extending from the casting 27 is a pair of arms 42 provided with bearings at their upper ends to receive therethrough a longitudinally extending shaft 43 upon which are mounted bell crank levers 44 for rocking movement thereon. These bell crank levers are disposed adjacent the drive pinion 34 and the reversing pinion 41, and are operatively engaged therewith by means of studs projecting from the lower ends of the arms 44 of the levers and engaged in the grooves formed in the pinions, as in the ordinary type of construction.

Secured at its ends to the transversely extending beams 26 is a second substantially inverted U-shaped bracket beam 44 which is spaced intermediate the ends of the beams 26 and is disposed to act as a support for bearing bars 45 and 46 respectively which are adapted to receive therethrough a substantially vertically extending shaft 47 having a bevel gear secured at its upper end and provided at its lower end with a bifurcated arm 48 for operative engagement with the groove in the clutch member 31 so as to enable the clutch member to be shifted upon the shaft 28 as will be hereinafter described.

A suitable hood or guard member 49 is secured to the main frame and extended over the exposed portion of the tractor wheel, and at opposite sides of the tractor wheel is mounted a pair of upwardly extending brackets 50 in transverse alinement and adapted to receive therethrough a hollow tube or shaft 51 projecting at one end over the operating platform having secured thereon an operating wheel or lever 52. The opposite projecting end of the tube or shaft 51 is provided with a sleeve 53 secured thereon and having thereon a pair of rocker arms 54 extending at angles therefrom and connected at their ends by means of links 55 to the upper ends of the bell crank levers 43. By this construction it will be seen that as the wheel 52 is rotated in the direction desired, the rocker arms will cause the pinions with which they are engaged through the medium of the bell crank levers 43, to be slid transversely upon their respective shafts, and when, as is the normal arrangement, the drive pinion 34 is engaged with the intermediate gear wheel 35, the reversing pinion 41 is disposed out of engagement. When it is desired to reverse the tractor, it is merely necessary to actuate the wheel 52 causing the rocker arms 54 to actuate their respective bell crank levers and slide the drive pinion 34 out of engagement with the intermediate gear 35, and at the same time sliding the reversing pinion 41 into engagement with the gear 35 and also into engagement with the drive pinion 34, thereby imparting a reverse drive to the tractor.

Journaled within the hollow tube or shaft 51 is a similar hollow shaft 56 having its ends projecting beyond the ends of the shaft 51 and provided at the end projecting over the operating platform with an operating wheel or lever 57, and provided at its opposite end with a bevel pinion 58 disposed in mesh with the bevel gear secured on the upper end of the vertically disposed clutch shifting shaft 47 so that when the wheel 57 is rotated in the direction desired, the shaft 47 will be rotated within its bearings 45 and 46, and owing to its operative engagement with the clutch member 31, the clutch will be drawn into and out of engagement with the fly wheel 30 of the motor as desired.

A third shaft 59 is extended through the shaft 56 and projects beyond the ends thereof and is also provided with an operating wheel or lever 60 at its end extending over the operating platform. The opposite end of the shaft 59 is journaled in bearing members formed at the upper ends of the arms 61 of a substantially U-shaped bracket 62 suitably secured to an inverted U-shaped bracket beam 63 having its ends secured to the longitudinally extending beam 25 forming a suitable support therefor. The end of the shaft 59 being mounted in the bearings as described, provides a support for the ends of the shafts hereinbefore mentioned.

Mounted between the bearings on the arms 61 and secured on the shaft 59 is a worm gear 46 disposed in mesh with worm gears 65 on the ends of the steering rods 66 which are in turn connected with the universal joints 14 of the guiding and steering wheels hereinbefore described. As a means of retaining the worm gears 65 in engagement with the worm 64, I provide a pair of substantially U-shaped yoke members 66 mounted at their ends on the shaft 59 between the arms 61 and adapted to act as bearings for the rods 66, whereby to maintain the worm gears in operative engagement. The worms 65 are mounted one above and one below the worm on the shaft 59 so that when the operating wheel 60 is rotated in the desired direction, the guiding wheels will be caused to turn in opposite directions which will enable the tractor to make a turn substantially within its own length, and which is a very desirable feature in tractors of this type.

Owing to the arrangement and location of the parts described, it will be seen that the steering wheel 60 is located at the outermost of the three operating wheels to be at all times readily accessible, and the gear shifting wheel 52 is arranged on the inner side to be also readily accessible to the operator. This construction disposes the clutch shifting wheel 57 between the steering and the gear shifting wheels so that when the tractor is being operated, there will be no danger of the operator inadvertently operating the wrong wheel.

By the construction of the parts herein described, it will be seen that I have provided a tractor which will be most efficient in operation, and in which all parts of the mechanism are readily accessible, and in which a direct even pull is insured upon the earth working elements which are so mounted below the main frame and beneath the axle of the tractor as to eliminate any danger of the elements becoming disengaged.

While I have described and illustrated in the accompanying drawings certain specific details entering into the construction and operation of my tractor, I desire it to be understood that I do not wish to limit myself specifically to these, but that any such may be employed as will fall within the scope of the invention as claimed.

I claim:

1. A device of the character described comprising a main frame, a pair of supporting and guiding wheels at one side thereof, a tractor wheel mounted therein adjacent the opposite side, a longitudinally extending balanced supplemental frame pivotally mounted in the main frame below the main frame and beneath the tractor axle and surrounding said tractor wheel, the opposite ends of said supplemental frame projecting beyond the ends of the main frame and in the path of the tractor wheel, and earth-working elements positioned in said projecting ends.

2. A device of the character described comprising a main frame, a pair of supporting and guiding wheels at one side thereof, a tractor wheel mounted in said frame at the opposite side thereof and intermediate its ends, standards depending from said main frame on opposite sides of the tractor wheel, a balanced longitudinally extending supplemental frame pivoted in said standards beneath the tractor wheel axle to swing below the main frame, said supplemental frame having an enlarged portion to surround the tractor wheel, the ends of the supplemental frame projecting beyond the adjacent ends of the main frame and substantially convergent to form narrowed end portions in the path of the tractor wheel, said end portions being bent upwardly beyond the adjacent ends of the main frame, and earth working elements positioned in said end portions.

In testimony whereof I have hereunto set my hand in the presence of two subscribing witnesses.

IRA L. SCOTT.

Witnesses:
M. C. GRUND,
T. A. NOONE.